Patented Mar. 11, 1924.

1,486,781

UNITED STATES PATENT OFFICE.

JOSEPH V. MEIGS, OF MONTCLAIR, NEW JERSEY, ASSIGNOR, BY MESNE ASSIGNMENTS, TO CARLETON ELLIS, OF MONTCLAIR, NEW JERSEY.

CATALYTIC MATERIAL FOR THE OXIDATION OF AROMATIC COMPOUNDS BY MEANS OF OXYGEN-CONTAINING GASES.

No Drawing. Application filed February 11, 1919. Serial No. 276,380.

*To all whom it may concern:*

Be it known that I, JOSEPH V. MEIGS, a citizen of the United States, and a resident of Montclair, in the county of Essex and State of New Jersey, have invented certain new and useful Improvements in Catalytic Material for the Oxidation of Aromatic Compounds by Means of Oxygen-Containing Gases, of which the following is a specification.

This invention relates to catalytic processes and to catalyzers adapted therefor, and relates especially to methods of oxidizing aromatic hydrocarbons, phenolic bodies and their derivatives and the like through the agency of oxygen furnished by air or from other sources in the presence of contact material having the requisite catalytic oxidizing power. All as will be hereinafter described and as claimed.

An object of the present invention is to convert aromatic hydrocarbons especially those having side-chains such as toluol, xylol, cymene, cumene, mesitylene, cresols and the like and their derivatives including nitro derivatives and also includes the oxidation of bodies of the nature of naphthalene, anthracene and their derivatives including nitro derivatives which have side chains capable of oxidation into bodies containing oxygen or containing a larger amount of oxygen than the initial raw material. For example toluene may be converted into benzaldehyde or into benzoic acid; naphthalene may be converted into phthalic acid. Cresol may be converted into various carboxylic acids depending on form of cresol employed as for example in the case of ortho cresol, salicylic acid may be derived. From p-nitro toluene, p-nitro benzaldehyde and p-nitro benzoic acid may be obtained.

In carrying out my invention I preferably employ a catalyzer which is a compound containing at least two metallic bodies or elements. Preferably both of these elements are capable of forming oxides of more than one stage of oxidation. For example a compound of the nature of iron chromate may be employed. In this case both the iron and the chromium are capable of forming several oxides. In a similar manner I may employ chromium vanadate, iron molybdate, cobalt molybdate, cobalt chromate, nickel vanadate, nickel molybdate, nickel chromate, ceric vanadate, ceric chromate, ceric molybdate and similar composite catalytic bodies. Or I use a compound catalytic body, prepared essentially in the manner hereinafter set forth, containing three or more metals, for example, iron vanado chromate, iron ceric chromate and similar composite bodies. Or, I may use a composite catalytic body as above described and prepared essentially as hereinafter set forth, impregnated subsequent to its preparation, with a unitary oxide or mixture of oxides. For example I may use an iron chromate vesiculated contact mass or an iron molybdo chromate mass, and subsequent to the preparation of said mass, I may impregnate it with an active oxide of vanadium, for example, active vanadium pentoxide, or active palladium oxide. It has been proposed to use unitary oxides and mixtures of oxides for oxidizing hydrocarbons. My invention does not comprehend such catalytic material but primarily at least, or so far as the invention relates to the catalytic substance itself is concerned I make use of compounds of the character described rather than the oxides of the metals or similar catalytic substances. However so far as the oxidation procedure itself is concerned I do not limit myself to any special form of catalyzer but may use unitary or complex catalytic bodies as desired.

For purposes of illustration I will describe the employment of ferric chromate and ferric vanado chromate. Catalytic material may be prepared containing this agent by proceeding in the following manner:

58.6 parts by weight of ammonium bichromate are dissolved in 140 parts of water, 50 parts of anhydrous ferric chloride are dissolved in 60 parts of water. The solutions are mixed and evaporated. Just before the mass becomes dry it assumes a peculiar tar-like consistency and then as the heating is continued, whitish fumes are copiously evolved and an increase in volume takes place. During the last stages of the heating owing to the evolution of gases and vapors in the tarry mass, intumescence occurs and a solid porous dark colored catalytic mass is obtained. This feature of carrying out the operation to produce a highly viscous mass, rather than one which crystallizes, during the last stages of evaporation, is a useful one in preparing an active catalyzer, as the formation of gases in such a viscous product produces a vesiculated contact material having some peculiar property of porosity which aids in the absorbing or occluding effect desired in catalytic bodies of this character.

To prepare iron vanado chromate I proceed as follows: 58.6 parts by weight of ammonium bichromate are dissolved in 140 parts of water. 54.6 parts of anhydrous ferric chloride are dissolved in 60 parts of water. The solutions are mixed and brought to the boiling point and in the resulting hot solution 10 grams of ammonium metavanadate are dissolved. The resulting mixture is then evaporated to dryness and heated as above.

I will also describe, for purposes of illustration the impregnation of my vesiculated active contact mass with an active unitary oxide, for example vanadium pentoxide, using for purposes of illustration the active iron chromate mass prepared substantially as above described.

I first spray this mass with a solution of 5 parts of ammonium meta vanadate in 100 parts of hot water and heat the mass until it is dry. I then spray it with a sufficient quantity of dilute nitric acid to neutralize the ammonia in the ammonium meta vanadate and reheat until fumes and decomposition products of ammonium nitrate cease to be evolved.

Employing a catalytic substance of the nature above described for the oxidation of a body of the character of toluene, for example, I find that on introducing the toluene vapor in a current of air and preferably operating at slightly below atmospheric pressure, the oxidation takes place readily on bringing the vapor in contact with the hot contact material and that the heat of reaction is sufficient to maintain the contact substance in an incandescent state without the application of any external heat. Preferably the toluol is admixed with the air by means of a carbureting device. The regulation of the amount of air employed is important. The amount of oxygen should be only sufficient to carry out the oxidation within the limits imposed by the character of the product desired, provided such oxidation is sufficient to maintain the contact material at the requisite temperature. In the case of toluene this operation may be carried out very readily at a low red heat yielding a product containing substantial quantities of benzaldehyde, and benzoic acid.

Preferably the air entering the contact apparatus is preheated which may be done in various ways (as for example by a regenerative device abstracting heat from the exit gases). With an abundant supply of air oxidation takes place in a comparatively restricted zone, the combustion at that point being quite violent and raising the catalyzer to a bright red heat which in some cases may tend to bring about the destruction or polymerization of the compounds first formed. In order to avoid this increase in temperature the catalyzer tube may be cooled as by the regenerative method mentioned above or by other cooling means. Or preferably the content of oxygen in the air is reduced by the introduction of an inert gas such as steam, carbon dioxide, nitrogen and the like. The exit gases from the apparatus, which are depleted in their content of oxygen may be employed to dilute the incoming air and thus reduce the percentage of oxygen present. By another manner of procedure, the air may be admitted at various points in the catalytic zone so that pure toluene vapors, for example, entering the contact mass first come in contact with a small amount of air where initial oxidation takes place, and additional quantities of air are added as the vapors progress through the catalytic mass. By working under reduced pressure, reactions producing gaseous material are facilitated and in the present case I prefer as stated, to operate under pressures slightly below atmospheric, although I do not limit myself to this procedure and may employ atmospheric pressure or pressures somewhat above in case the operation so warrants.

What I claim is:—

1. A catalyzer mass comprising ferric vanado chromate and adapted for use in oxidizing aromatic hydrocarbons.

2. A catalyzer mass adapted for use in oxidizing aromatic hydrocarbons comprising vesiculated ferric vanado chromate.

3. The process of making a catalyzer adapted for use in the oxidation of aromatic hydrocarbons which consists in heating iron chloride, ammonium vanadate and ammonium bichromate in aqueous solution until the mass becomes of a tarry consistency and in continuing the heating while fumes are being evolved and until a porous vesiculated mass is produced.

4. A catalyzer adapted for use in the oxidation of aromatic hydrocarbons and other substances which comprises a double salt consisting of metallic elements and oxygen, at least two of said metallic elements being capable of existing in more than one state of oxidation, and said metallic elements being substantially stable in air at ordinary temperature.

5. A catalyzer adapted for use in the oxidation of aromatic hydrocarbons and other substances which comprises a double salt consisting of metallic elements and oxygen, at least two of said metallic elements being capable of existing in more than one state of oxidation, and being substantially stable in dry air, said catalyzer existing in a porous vesiculated condition.

6. A catalyst comprising an intumesced mass, free from inert supporting solids and containing, as its essential constituent a ferric salt of an acid containing a metal acting as an acid-forming element and falling within the fifth to sixth groups of the periodic system.

7. A catalyst comprising an intumesced mass, free from inert supporting solids, and containing as its essential constituent a mixed ferric salt, such salt containing besides iron, a plurality of metals capable of acting as acid forming elements.

8. A catalyzer mass consisting essentially of a ferric chromate intimately associated with an oxid of a metal other than iron or chromium which oxid is capable of serving as an oxidizing catalyst.

9. A catalyzer consisting essentially of a chromate compound of iron, such chromate being in a solid vesiculated condition.

10. A catalyzer comprising an oxygenated compound of iron, chromium and vanadium and adapted for oxidizing aromatic hydrocarbons.

11. A salt of an oxid of a metal of the eighth group of the periodic system having an atomic weight of about 56 to 59, with an acid-forming oxid of a metal of the fifth to sixth groups of the periodic system, such latter metal having an atomic weight between 51 and 96, such salt being in an intumesced condition and capable of serving as a catalyst for oxidation reactions.

JOSEPH V. MEIGS.